United States Patent
Havens et al.

(10) Patent No.: US 6,811,727 B2
(45) Date of Patent: Nov. 2, 2004

(54) OPHTHALMIC FILTER MATERIALS

(75) Inventors: Thomas G. Havens, Corning, NY (US); David J. Kerko, Sunset, SC (US); Brent M. Wedding, Corning, NY (US)

(73) Assignee: Corning Incorporated, Corning, NY (US)

( * ) Notice: Subject to any disclaimer, the term of this patent is extended or adjusted under 35 U.S.C. 154(b) by 219 days.

(21) Appl. No.: 10/044,595

(22) Filed: Jan. 9, 2002

(65) Prior Publication Data

US 2003/0164481 A1 Sep. 4, 2003

(51) Int. Cl.[7] .............................. G02B 5/23; G02C 7/10
(52) U.S. Cl. ...................................... 252/586; 351/163
(58) Field of Search ........................... 252/586; 351/163

(56) References Cited

U.S. PATENT DOCUMENTS

| | | | |
|---|---|---|---|
| 3,208,860 A | 9/1965 | Armistead et al. | |
| 3,562,172 A | 2/1971 | Ono et al. | |
| 3,567,605 A | 3/1971 | Becker | |
| 4,190,451 A | 2/1980 | Hares et al. | |
| 4,215,010 A | 7/1980 | Hovey et al. | |
| 4,284,686 A | 8/1981 | Wedding | |
| 4,342,668 A | 8/1982 | Hovey et al. | |
| 4,454,170 A | * 6/1984 | Goepfert et al. ........... | 427/160 |
| 4,634,767 A | 1/1987 | Hoelscher et al. | |
| 4,637,698 A | 1/1987 | Kwak et al. | |
| 4,699,473 A | 10/1987 | Chu | |
| 4,720,547 A | 1/1988 | Kwak et al. | |
| 4,756,973 A | 7/1988 | Sakagami et al. | |
| 4,784,474 A | 11/1988 | Yamamoto et al. | |
| 4,785,097 A | 11/1988 | Kwak | |
| 4,792,224 A | 12/1988 | Kwiatkowski et al. | |
| 4,816,584 A | 3/1989 | Kwak et al. | |
| 4,831,142 A | 5/1989 | Kwak | |
| 4,851,471 A | 7/1989 | Maltman et al. | |
| 4,851,530 A | 7/1989 | Rickwood | |
| 4,889,413 A | 12/1989 | Ormsby et al. | |
| 4,909,963 A | 3/1990 | Kwak et al. | |
| 4,913,544 A | 4/1990 | Rickwood et al. | |
| 4,931,219 A | 6/1990 | Kwiatkowski et al. | |
| 4,931,221 A | 6/1990 | Heller | |
| 4,936,995 A | 6/1990 | Kwiatkowski | |
| 4,980,089 A | 12/1990 | Heller | |
| 4,986,934 A | 1/1991 | Kwiatkowski et al. | |
| 4,994,208 A | 2/1991 | McBain et al. | |
| 5,066,818 A | 11/1991 | Gemert et al. | |
| 5,106,998 A | 4/1992 | Tanaka et al. | |
| 5,114,621 A | 5/1992 | Guglielmetti et al. | |
| 5,130,058 A | 7/1992 | Tanaka et al. | |
| 5,130,353 A | 7/1992 | Fischer et al. | |
| 5,139,707 A | 8/1992 | Guglielmetti et al. | |

(List continued on next page.)

FOREIGN PATENT DOCUMENTS

| | | |
|---|---|---|
| EP | 0 508219 | 12/1984 |
| EP | 0 171909 | 7/1985 |
| EP | 0 232295 | 7/1986 |
| EP | 0 562915 | 3/1993 |

Primary Examiner—Philip C. Tucker
(74) Attorney, Agent, or Firm—Siwen Chen

(57) ABSTRACT

Disclosed is a photochromic plastic ophthalmic lenses having polymer matrices with an effective amount of at least one photochromic agent distributed therein, applied thereto or associated therewith and at least one ophthalmic filtering dye applied thereto, associated therewith or distributed therein the lens. A group of the filter lenses have dominant wavelengthes between 570 and 605 nm and color purity between 50% and 75%. Another lens product of the present invention is particularly suitable for patients suffering from retinitis pigmentosa. The lenses of the present invention are particularly suitable for individuals bothered by strong or variable illumination intensity.

21 Claims, 7 Drawing Sheets

U.S. PATENT DOCUMENTS

| | | |
|---|---|---|
| 5,166,345 A | 11/1992 | Akashi et al. |
| 5,171,636 A | 12/1992 | Castaldi et al. |
| 5,180,254 A | 1/1993 | Matiere |
| 5,180,524 A | 1/1993 | Casilli et al. |
| 5,185,390 A | 2/1993 | Fischer et al. |
| 5,200,116 A | 4/1993 | Heller |
| 5,233,038 A | 8/1993 | Guglielmetti et al. |
| 5,238,981 A | 8/1993 | Knowles |
| 5,244,602 A | 9/1993 | Van Gemert |
| 5,246,630 A | 9/1993 | Selvig |
| 5,381,193 A | 1/1995 | Wedding |
| 5,708,064 A * | 1/1998 | Coleman et al. ............... 524/90 |
| 5,973,039 A | 10/1999 | Florent et al. |
| 5,973,865 A | 10/1999 | Havens et al. |
| 6,034,193 A | 3/2000 | Henry et al. |
| 6,174,464 B1 * | 1/2001 | Garrity ....................... 252/586 |
| 6,197,711 B1 | 3/2001 | Havens et al. |
| 6,262,155 B1 | 7/2001 | Florent et al. |
| 6,476,103 B1 * | 11/2002 | Baney et al. ................. 524/94 |

* cited by examiner

OPHTHALMIC FILTER MATERIALS

FIELD OF THE INVENTION

The present invention relates to ophthalmic filter materials, in particular, to lenses designed to protect the eye from the effects of strong sunlight.

BACKGROUND OF THE INVENTION

The present invention relates to ophthalmic filter materials, particularly, to ophthalmic filter lenses. These materials selectively transmit radiation in the visual and near-visual regions of the electromagnetic radiation spectrum. The materials of the present invention are primarily concerned with controlled transmission of sunlight and ambient light through ophthalmic lenses.

The present invention was developed employing photochromic lenses, particularly, photochromic lenses made of organic polymers. The present invention may find application in products other than ophthalmic lenses, such as visors and shields or windows.

Certain diseases of the eye and/or visual deficiencies may be caused by, or may be aggravated by, strong sunlight. The radiation at the short end of the visible spectrum, that is, at wavelengths on the order of 400–550 nanometers (nm), seems to create the greatest problems for some patients. The eye contains two different kinds of photo receptors, viz., cones and rods. The cones comprise the principal receptors in daylight vision (diurnal vision or photopic vision), and the rods constitute the principal receptors in night vision (nocturnal vision or scotopic vision). The cones are located generally in the center portion of the retina, and are much greater in number per unit area. They permit the recognition of fine detail, presumably because they function largely independently of one another. The cones also permit color vision, i.e., they allow hues and saturation to be distinguished. In the presence of bright light, the eye is most sensitive to radiation at about 555 nm. In general, the rods are located at the peripheral portions of the retina, there being few, if any, rods found in the central retina. The rods do not permit the recognition of colors, only shades of gray. The peak wavelength sensitivity is near 505 nm.

Most of the ophthalmic filter lenses of the past have been made on the basis of inorganic glass photochromic lenses. These photochromic glasses contain, in addition to an inorganic glass phase, a precipitated microcrystalline silver halide phase. It is the silver halide phase that is considered to cause the reversible darkening of the glass under exposure to light.

Past ophthalmic filter lenses have been made from polycarbonate optical plastics with a tintable coating thereon. However, such plastic lenses were not photochromic. Thus they cannot fit the needs of some of the patients who suffer from strong sunlight. For persons subject to aphakia, retinitis (including photoretinitis, retinitis caused by virus, fungi or bacteria infection, contusion, and degenerative retinopathy), and retinitis pigmentosa, photochromic filter lenses are desired. It has generally been accepted that retinal degeneration can be decelerated by preventing both receptors of the retina (cones and rods) from being subject to bright illumination and great changes in light levels. Photochromic lenses would act to compensate for differences in indoor and outdoor radiation intensity levels.

There remains a genuine need for ophthalmic filter lenses based on photochromic plastic lenses. While desired to have the wavelength filtration properties of the prior art glass-based photochromic ophthalmic filter lenses discussed above, such plastic lenses should be advantageously durable and lighter in weight. Light transmission properties of the lenses should be able to impart sufficiently low color distortion. It would be beneficial for the lenses to have good photochromic properties in terms of colorability, darkening and fading kinetics, and durability in coloration, etc.

SUMMARY OF THE INVENTION

Thus the present invention provides a photochromic plastic filter lens having a polymer matrix with at least one photochromic agent distributed therein, applied thereto or associated therewith and at least one ophthalmic filtering dye applied thereto, associated therewith or distributed therein, which provides filtering properties having a dominant wavelength between 570 and 605 nm and a color purity between 50% and 75%. The present inventive lenses are particularly useful for users with eye conditions described above. They operate to modify the stimuli to the photoreceptors of the retina in a manner beneficial to the patient.

In another aspect of the present invention, for patients suffering from retinitis pigmentosa, the present invention provides a plastic photochromic filter lens having a polymer matrix with at least one photochromic agent distributed therein, applied thereto or associated therewith and at least one ophthalmic filtering dye applied thereto, associated therewith or distributed therein, which exhibits substantially reduced transmittance of radiation having wavelengths shorter than about 550 nm, a photopic transmittance no greater than about 25% in the faded state and no greater than about 5% in the darkened state, and a scotopic transmittance no greater than about 3% in the faded state and no greater than about 1% in the darkened state, at a wavelength between about 450–550 nm.

Preferably, the polymer matrix of the ophthalmic lens of the present invention is made of polymers selected from the group consisting of poly($C_1$–$C_{12}$ alkyl methacrylates), poly (oxyalkylene dimethacrylates), poly(alkoxylated phenol methacrylates), cellulose acetate, cellulose triacetate, cellulose acetate propionate, cellulose acetate butyrate, poly (vinyl acetate), poly(vinyl alcohol), poly(vinyl chloride), poly(vinylidene chloride), thermoplastic polycarbonates, polyesters, polyurethanes, poly(ethylene terephthalate), polystyrene, poly($\alpha$-methylstyrene), poly(styrene-co-methyl methacrylate), poly(styrene-co-acrylonitrile), polyvinylbutyral and polymers and/or copolymers of monomers selected from the group consisting of polyol (allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly (ethylene glycol) bismethacrylate monomers, ethoxylated phenol methacrylate monomers, alkoxylated polyhydric alcohol acrylated monomers and diallylidene pentaerythritol monomers.

Preferably, the at least one photochromic agent is selected from the group consisting of spiroxazines, spiropyrans and chromenes. Preferably, the photochromic agent is distributed throughout the polymer matrix.

In another aspect of the present invention, it is provided a method to produce the ophthalmic photochromic plastic lenses of the present invention, which comprises treating a photochromic plastic article in at least one solution of at least one filtering dye for a time sufficient to impart the recited characteristics to the article.

In still another aspect, the present invention provides a method for producing the ophthalmic photochromic filter lenses of the present invention, which comprises adding and dispersing an effective amount of at least one photochromic agent and an effective amount of at least one ophthalmic filtering agent to a monomer or a mixture of monomers, and thereafter polymerizing the resultant mixture into a photochromic filtering polymer to produce the lens.

Additional features and advantages of the invention will be set forth in the detailed description which follows, and in part will be readily apparent to those skilled in the art from the description or recognized by practicing the invention as described in the written description and claims hererof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention, and together with the description serve to explain the principles and operation of the invention.

DETAILED DESCRIPTION OF THE PRESENT INVENTION

Figure 1:
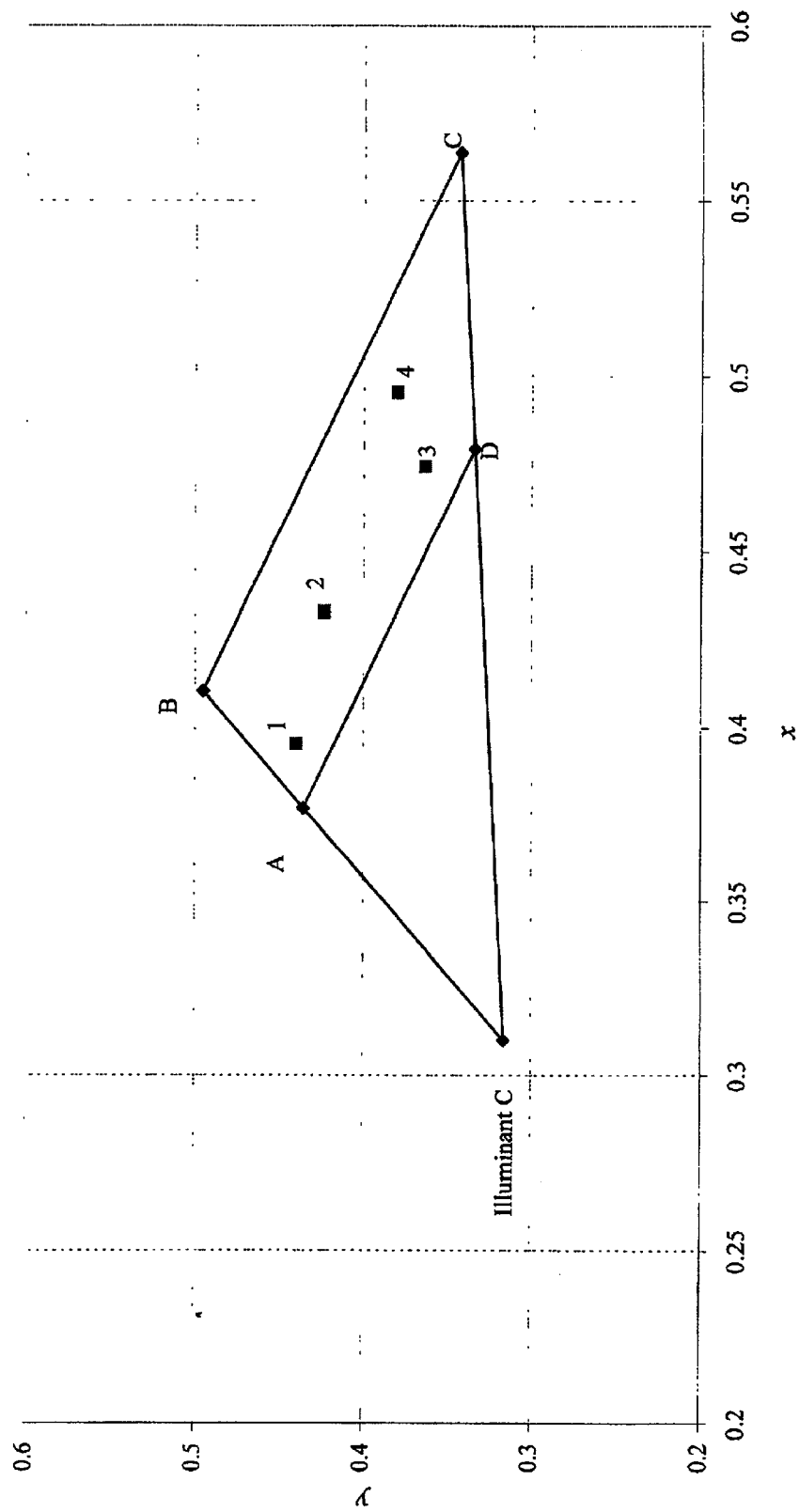
FIG. 1 is a color mixture diagram of a group of the ophthalmic filter lenses of the present invention, showing the chromaticity loci of examples 1–4 and the characteristic limits of that group of filter lenses of the present invention.

To meet the needs of ophthalmic filter lens users, especially those users who desire a photochromic filter lens, the present inventors ventured to develop a plastic photochromic filter lens. As a result, a photochromic plastic lens having a polymer matrix with at least one photochromic agent distributed therein, applied thereto or associated therewith and at least one ophthalmic filtering dye applied thereto, associated therewith or distributed therein was developed. The wavelength filtration properties and the photochromic properties of the lenses are particularly suitable for users bothered by intense and/or variable illumination.

The polymer matrix of the filter lens of the present invention is preferably an optical polymer. Non-limiting examples of polymers that can be used include poly($C_1$–$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly($\alpha$-methylstyrene), poly(styrene-co-methyl methacrylate), poly(styrene-co-acrylonitrile), polyvinylbutyral and polymers and/or copolymers of monomers selected from the group consisting of polyol (allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly (ethylene glycol) bismethacrylate monomers, ethoxylated phenol methacrylate monomers, alkoxylated polyhydric alcohol acrylated monomers and diallylidene pentaerythritol monomers. One skilled in the art can choose from various polymers to produce the lens body having the desired refractive index, optical distortion, mechanical strength, durability, density, and other physical properties, as well as compatibility with the photochromic agents and the filtering dyes. Many optical polymers are commercially available, or can be prepared according to polymerization techniques from various kinds of monomers. The polymer matrix can be uniformly composed of one polymer phase, or can take the form of a laminate with more than one layer of an identical or different polymer joining with one another through an intermediate layer, for example, but not limited to, a pressure sensitive adhesive layer.

An especially useful type of polymer matrix for the present inventive filter lens is made of at least one polymer selected from the group consisting of homopolymers, copolymers and any combination of polymers of at least one monomer having the following formula (I):

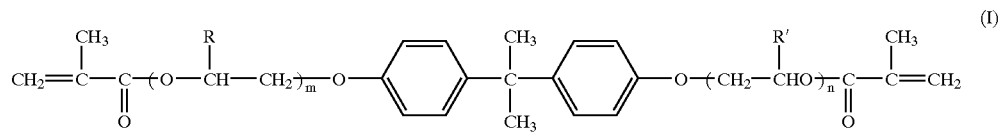

(I)

wherein,

R and R', identical or different, independently are $CH_3$ or H;

m and n, identical or different, independently are integers between 0 and 4 inclusive; and copolymers of at least one monomer having formula (I) and an aromatic monomer bearing vinyl, acrylic, or methacrylic functionality.

A type of polymer particularly suitable for the production of photochromic organic ophthalmic filter lenses and a method for producing the same of the present invention is chosen from: homopolymers of ethoxylated bisphenol A dimethacrylate having formula (II):

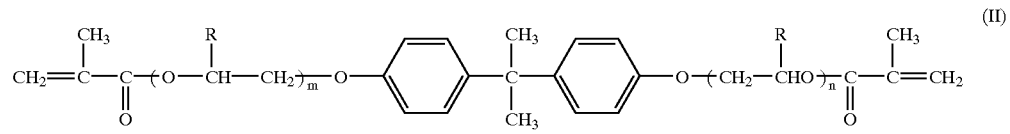

(II)

in which R is H or $CH_3$, and m and n independently represent 1 or 2, and polymers of ethoxylated bisphenol A dimethacrylate containing, at most 30% of at least one aromatic monomer with vinyl, acrylic, or methacrylic functionality.

A specific polymer suitable for the present inventive photochromic plastic lenses is obtained by copolymerizing (a) 80–95% by weight of at least one monomer of formula (II), where R is H or $CH_3$ and m and n independently are 1 or 2, and (b) 5–20% by weight of at least one aromatic monovinyl monomer of formula (III)

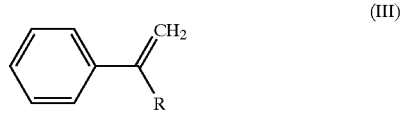

where R is H or $CH_3$, with other optional monomers.

These homopolymers or copolymers of ethoxylated bisphenol A dimethacrylate are particularly suitable for producing the ophthalmic photochromic plastic filter lenses of the present invention. An advantage of these polymer matrices is that they can be produced by a single step polymerization of monomers with photochromic agents contained therein using free radical polymerization method. In a preferred embodiment of the photochromic filter lens of the present invention, the matrix of the lens is made of at least one polymer containing units from a monomer of formula (I) where R and R' are H, and m=n=1.

A polymer material particularly suitable for the present inventive filter lens is a commercially available product of Corning Incorporated, Corning, N.Y., marketed under the tradename of SUNSENSOR®. This product has photochromic agents incorporated therein, and the photochromic agents are distributed throughout the polymer matrix using the "in-mass" technology. This brand of photochromic plastic lenses are easy to be tinted by the filtering dyes to form the photochromic filter lenses of the present invention. Unlike some polymer matrices, they can be tinted by the filtering dye solutions directly without additional prior surface treatment.

The photochromic agents used in the ophthalmic filter lenses of the present invention can be chosen from the general classes of spiroxazines, spiropyrans and chromenes having photochromic properties. Preferably, the at least one photochromic agent is selected from the group consisting of naphthopyrans, benzopyrans, phenanthropyrans, spiro(benzindoline)naphthopyrans, spiro(indoline)benzopyrans, spiro(indoline)naphthopyrans, spiro(indoline)quinopyrans, spiro(indoline)pyrans, spiro(indoline)naphthoxazines, spiro(indoline)pyridobenzoxazines, spiro(benzindoline)pyridobenzoxazines, spiro(benzindoline)naphthoxazines, spiro(indoline)benzoxazines and any mixture or combination thereof. In a preferred embodiment of the photochromic filter lens of the present invention, the photochromic agent is 1,3,3-trimethylspiro[2H-indole-2,3'[3H]phenanthra(9,10b)[1,4]oxazine]. Particularly, in a more preferred embodiment, this photochromic agent is used in connection with lens matrix made of at least one polymer containing units from a monomer of formula (I) where R and R' are H, and m=n=1.

Quite a large number of photochromic agents are described in the literature and are available commercially. They are described for example in U.S. Pat. Nos. 5,246,630 and 4,994,208, both herein incorporated by reference. Examples of useful spiroxazines for the present invention are described in U.S. Pat. Nos. 3,562,172; 4,634,767; 4,637, 698; 4,720,547; 4,756,973; 4,785,097; 4,792,224; 4,784,474; 4,851,471; 4,816,584; 4,831,142; 4,909,963; 4,931,219; 4,936,995; 4,986,934; 5,114,621; 5,139,707; 5,233,038; 4,215,010; 4,342,668; 4,699,473; 4,851,530; 4,913,544; 5,171,636; 5,180,524 and 5,166,345, and also in EP-A 0,508,219; 0,232,295 and 0171,909, among others, herein incorporated by reference. Examples of chromenes that can be used are describe also in U.S. Pat. Nos. 3,567,605; 4,889,413; 4,931,221; 5,200,116; 5,066,818; 5,244,602; 5,238,981; 5,106,998; 4,980,089 and 5,130,058 and EP-A 0,562,915, all herein incorporated by reference. Useful spiropyrans have been described in the literature, for example, in *Photochromism*, G. Brown, Ed., Techniques of Chemistry, Wiley Interscience, Vol. III, 1971, Chapter III, pp. 45–294, R. C. Bertelson; and *Photochromism, Molecules and Systems*, Edited by H. Durr, H. Bouas-Laurent, Elsevier, 1990, Chapter 8, "Spiropyrans," pp. 314–455, R. Guglielmetti, all herein incorporated by reference. On an indicative and nonlimiting basis, the proportion of photochromic coloring agent(s) to be incorporated in the matrix can range from, for example, 0.03 to 0.3% by weight, and preferably from 0.05 to 0.1% by weight, of the matrix. The photochromic agent can be incorporated into the matrix and distributed throughout it, which can be effected by polymerizing monomers with photochromic agents dispersed therein, using polymerization methods disclosed in the art. Or alternatively, the photochromic agents can be distributed into, associated with or applied to the matrix or part of the matrix by thermal diffusion for a period of time. Such thermal diffusion processes are described in, for example, U.S. Pat. Nos. 5,130,353; 5,185,390 and 5,180,254, herein incorporated by reference. Or the photochromic agents can form a layer sandwiched between multiple polymer matrix layers. Usually photochromic agents distributed into the polymer matrix through thermal diffusion, or imbibation, are limited to a thin layer near the surface of the lens, thus are prone to be lost when subject to further treatment. Therefore, it is preferred to have the photochromic agents distributed throughout the polymer matrix, as in SUNSENSOR® photochromic plastic lenses available from Coming Incorporated, Corning, N.Y.

At least one ophthalmic filtering dye is distributed in, applied to or associated with the polymer matrix of the present invention ophthalmic photochromic filter lenses. Many of such dyes are commercially available, including, but not limited to, BPI green, blue, yellow and red, available from Brain Power, Inc., Miami, Fla., and ultra optics brown, available from Ultra Optics, Brooklyn Center, Minn. These dyes impart permanent colors and specific wavelength filtration properties to the lenses. On an indicative and nonlimiting basis, dyes can be applied to at least one surface of the polymer matrix after it is shaped and thereby form a filtering dye layer. Or alternatively, such dyes can be added to the monomer together with the photochromic agents and then polymerized to form the filter lens of the present invention in a single step, using polymerization techniques available in the art, e.g., free radical polymerization. Polymer lenses thus formed contain the photochromic dyes and the filtering dyes throughout the polymer matrices. Or even, such dyes can form a layer sandwiched between multiple polymer matrix layers.

By carefully selecting at least one dye and/or a combination of more than one dye, photochromic agents and polymer matrix, the present inventors have produced photochromic ophthalmic filter lenses with, on the color mixture diagram, using the 1931 CIE standard observer and illuminant C (daylight), a dominant wavelength between 570 and 605 nm, and a color purity of between 50% and 75%. Preferably, the photochromic filter lens of the present invention also has excellent photochromic properties in terms of durability in coloration and discoloration, darkening and fading kinetics, and colorability. The polygon ABCDA in color mixture diagram FIG. 1 shows the property limits of a group of the present inventive ophthalmic photochromic filter lenses. This color mixture diagram is calculated using tristimulus colorimetry. In the diagram, the points A, B, C, D and Illuminant C have the following chromaticity coordinates as shown in TABLE 1. Filtration properties falling within this color box are particularly desirable for patients.

TABLE 1

|  | x | y |
|---|---|---|
| A | 0.3771 | 0.4355 |
| B | 0.4106 | 0.4951 |
| C | 0.5637 | 0.3426 |
| D | 0.4792 | 0.3339 |
| Illuminant C | 0.3101 | 0.3161 |

Preferably, the ophthalmic photochromic filter lenses of the present invention exhibit strongly reduced transmittance of radiations having a wavelength shorter than about 440 nm. As used herein, "strongly reduced" means sufficiently reduced to impart transmittance properties of the lens to fall within the color box ABCDA of FIG. 1

In an embodiment of the present invention, the ophthalmic filter lenses of the present invention exhibit substantially reduced transmittance of radiation having wavelengths shorter than about 550 nm, a reduced photopic transmittance no greater than about 25% in the faded state and no greater than about 10% in the darkened state, and a scotopic transmittance no greater than about 3% in the faded state and no greater than 1% in the darkened state, at a wavelength between about 450–550 nm. The filtering property of the lens of this embodiment falls outside of the color box ABCDA as shown in the color mixture diagram of FIG. 1, but it specially fits the needs of patients suffering from retinitis pigmentosa.

The ophthalmic filter lens of the present invention can be produced by treating polymer lens matrix which contains photochromic agents distributed therein, associated therewith or applied thereto with at least one filtering dye for a sufficient time to impart the desired properties to the lens. On an indicative and non-limiting basis, such treating can be coating effected by dipping the pre-formed photochromic plastic lens into a solution of the at least one filtering dye. Other coating methods, including, but not limited to, spraying coating, spin coating and flow coating can be employed as well. It is understood that dye additives can be used together with the dyes where necessary. Such treating can be performed on one surface of the lens body, or on both surfaces. Optionally, the lens surface may be subject to additional treatments before or after tinting. Such prior treatments include, but not limited to, application of scratch resistant coating, antireflective coating, or a coating to facilitate tinting. Coloration of the lens during the tinting process can be monitored using equipment known in the art. To obtain the desired coloration, each treating time can be adjusted; multiple treating steps may be adopted as well; also, bleaching solutions can be used to remove part of the coloration if necessary in case coloration was exceedingly intense. Where multiple treating is involved in solution dipping, it is preferred to have the lens rinsed in deionized water after each treating step. Preferably, resulted coating is monitored and controlled after each treating step using a spectrophotometer to obtain the best filter lens of the present invention with stable and consistent quality.

It is contemplated that the present inventive filter lens can be produced by adding and dispersing an effective amount of at least one photochromic agent and an effective amount of at least one ophthalmic filtering agent to a monomer or a mixture or monomers, and thereafter polymerzing the resultant mixture into a photochromic filtering polymer. In adopting this method, photochromic agents and filtering dyes compatible with the monomers and polymerization process are required. The photochromiticity properties of the photochromic agents and the coloration and wavelength filtration properties of the filtering dyes should not be destroyed or reduced to too low after the polymerization. Monomers of formula (I), supra, are particularly suitable for producing filter lens of the present invention using this approach. In a preferred embodiment of the method of the present invention for the production of the photochromic filter lens, photochromic agents and filtering dyes are added to monomers contain those represented by formula (I) wherein R and R' are H, and m=n=1. In a more preferred embodiment, the monomers used contain those represented by formula (I) wherein R and R' are H, and m=n=1, and the photochromic agent used is 1,3,3-trimethylspiro[2H-indole-2,3'[3H] phenanthra(9,10b)[1,4]oxazine].

It is also contemplated that the present inventive photochromic filter lens can be produced by distributing the filtering dyes in a film or transparent matrix, and then attaching the filtering film or matrix with one or more than one photochromic plastic lens. In an embodiment, the filtering dyes are distributed in a pressure-sensitive adhesive (PSA) layer, then the PSA layer is sandwiched between multiple polymer matrices, among which at least one is photochromic.

The present invention is further illustrated by the following non-limiting examples.

EXAMPLES

In the following examples, the following dyes were used: BPI Yellow and Red, available from Brain Power, Inc., Miami, Fla.; and Ultra Optics Brown, available from Ultra Optics, Brooklyn Center, Minn. Solutions of dyes were prepared according to the manufacturer's instructions, and were maintained at a temperature between 200 and 208° F.

In examples 1–4 and 6, a pre-formed photochromic plastic lens, available from Corning Incorporated, Corning, N.Y. under the trade name SUNSENSOR® was used for dipping into the solutions and tinted for different periods of time to produce the filter lens of the present invention. The color was monitored using a spectrophotometer after each step. Also, after each dyeing step, the lenses were rinsed in deionized water.

In Example 5, a photochromic plastic material available from Transitions Optical, Pinellas Park, Fla. under the trade name TRANSITIONS® 3, was used in place of the Corning SUNSENSOR® plastic. Similar tinting method was used. In contrast to SUNSENSOR®, this lens was made by the imbibing technology, i.e., the photochromic agents were not distributed throughout the lens body, but diffused to a thin layer near the lens surface.

Wavelength transmittance properties of the resulted tinted products were measured using a spectrophotometer. Tristimulus values were calculated from the measured data, using a weighed ordinate method with the 1931 standard observer and illuminant C (daylight). Computed values for the filter lens of examples 1–6 are provided in TABLE 2, in which, X, Y, Z are the tristimulus values; x and y the chromaticity coordinates; and Y and Y', respectively, the photopic and scotopic transmittance values. Chromaticity coordinates of the products of examples 1–4 are provided in the color mixture diagram FIG. 1 as well.

TABLE 2

| Example | 1 | 2 | 3 | 4 | 5 | 6 |
|---|---|---|---|---|---|---|
| X | 69.4 | 60.7 | 50.1 | 26.2 | 61.68 | 38.54 |
| Y | 77.1 | 59.4 | 38.4 | 20.1 | 59.12 | 23.83 |
| Z | 28.9 | 20.2 | 17.1 | 6.6 | 20.91 | 4.658 |
| x | 0.3956 | 0.4328 | 0.4743 | 0.4954 | 0.4352 | 0.5750 |
| y | 0.4397 | 0.4233 | 0.3635 | 0.3802 | 0.4172 | 0.3555 |
| Y' | 55.2 | 36.4 | 17.8 | 7.7 | 35.00 | 4.83 |

Example 1

Figure 2:
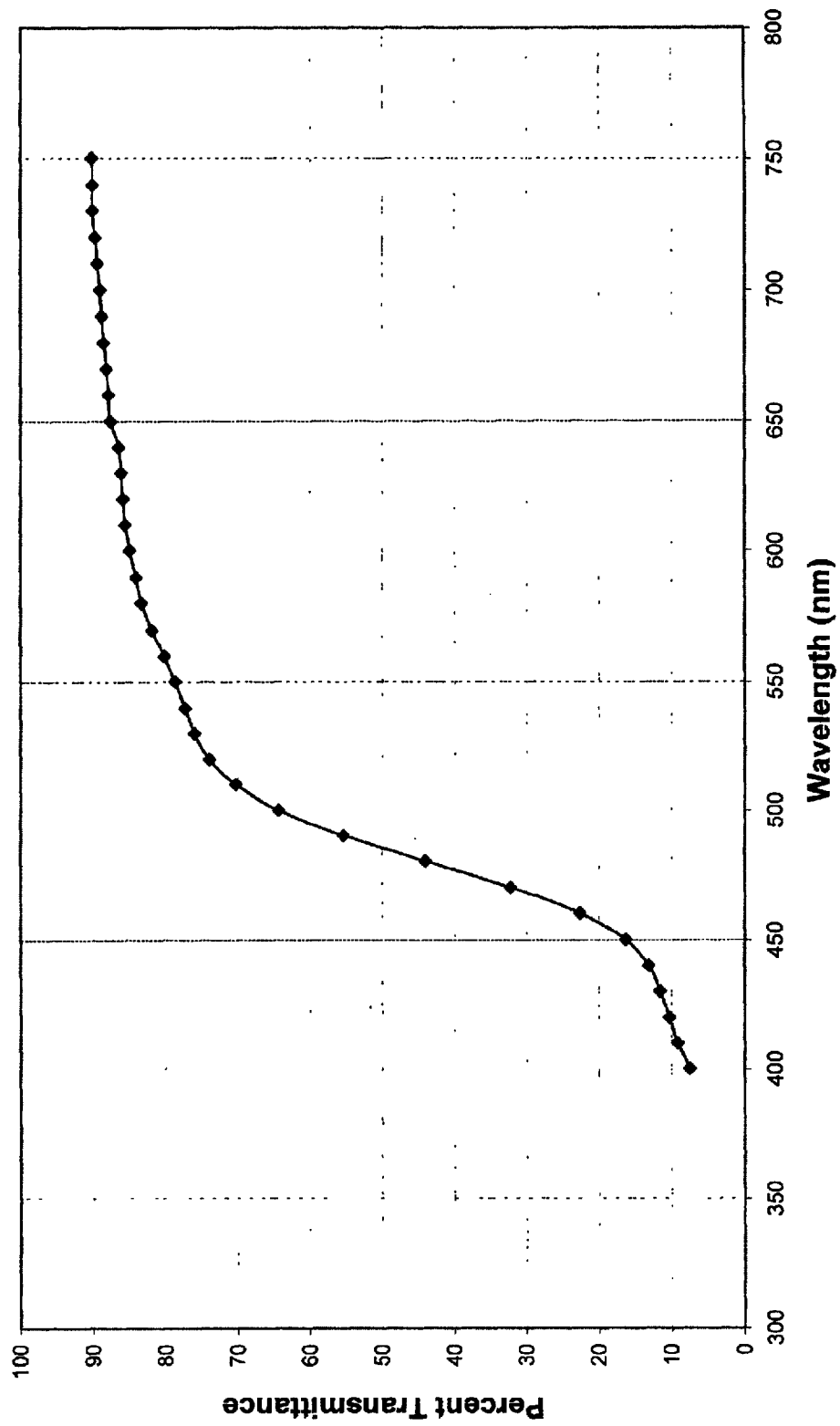
FIGS. 2–7 are graphical representation of the spectral transmittance values for exemplary lenses of the present invention.

A SUNSENSOR® photochromic plastic lens was dipped into and tinted for 30 seconds in the yellow dye, followed by 1 second tinting in red dye and subsequent brief dips in yellow or red dyes as needed. Spectral transmittance values and curve for the resulted filter lens were provided in FIG. 2.

Example 2

Figure 3:
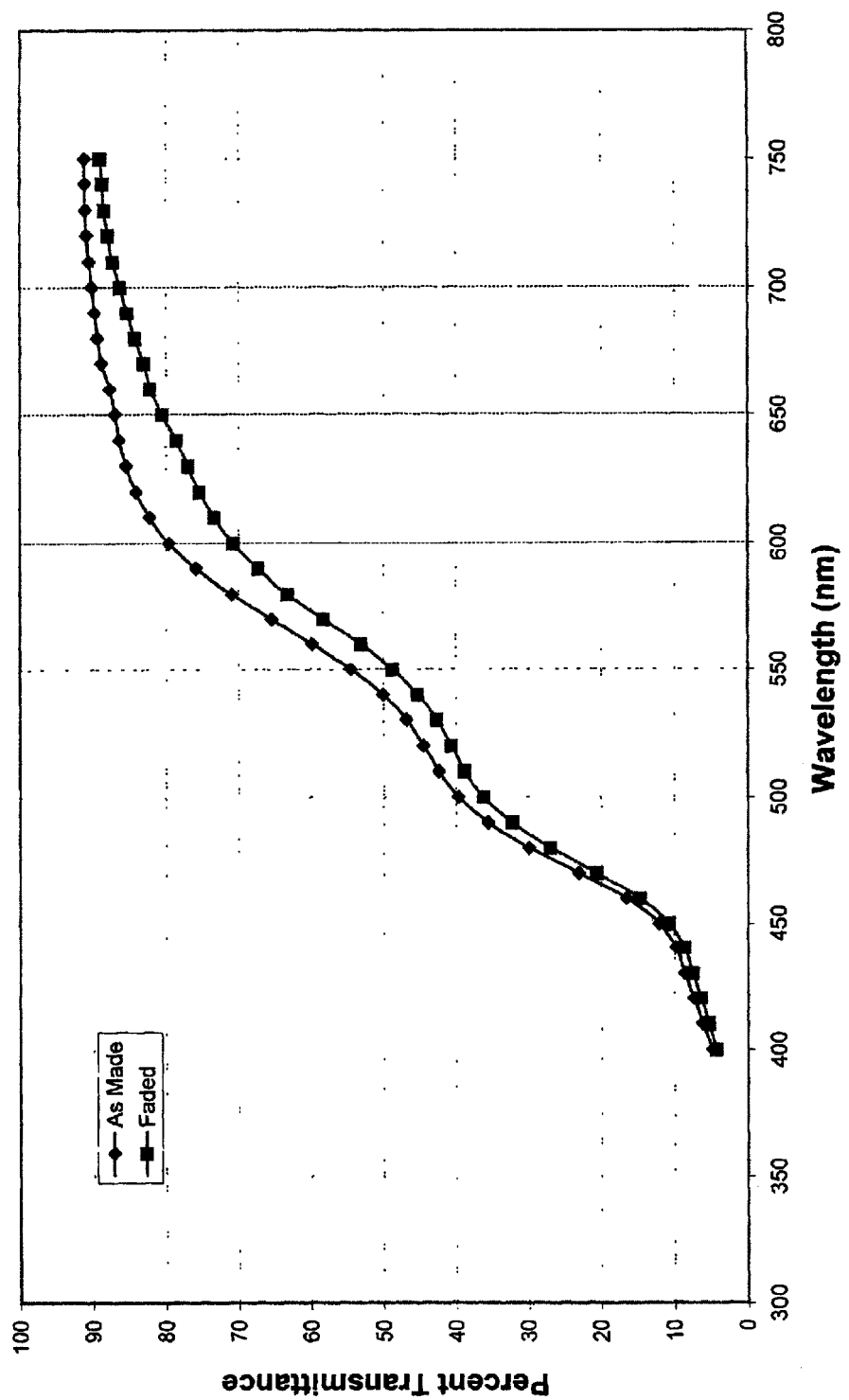

A SUNSENSOR® photochromic plastic lens was dipped into and tinted for 60 seconds in the yellow dye, followed by 5 seconds tinting in red dye and subsequent brief dips in yellow or red dyes as needed. Spectral transmittance values and curves for the resulted filter lens in the "as-made" state and subsequent to outdoor darkening and overnight fade were provided in FIG. 3.

Example 3

Figure 4:
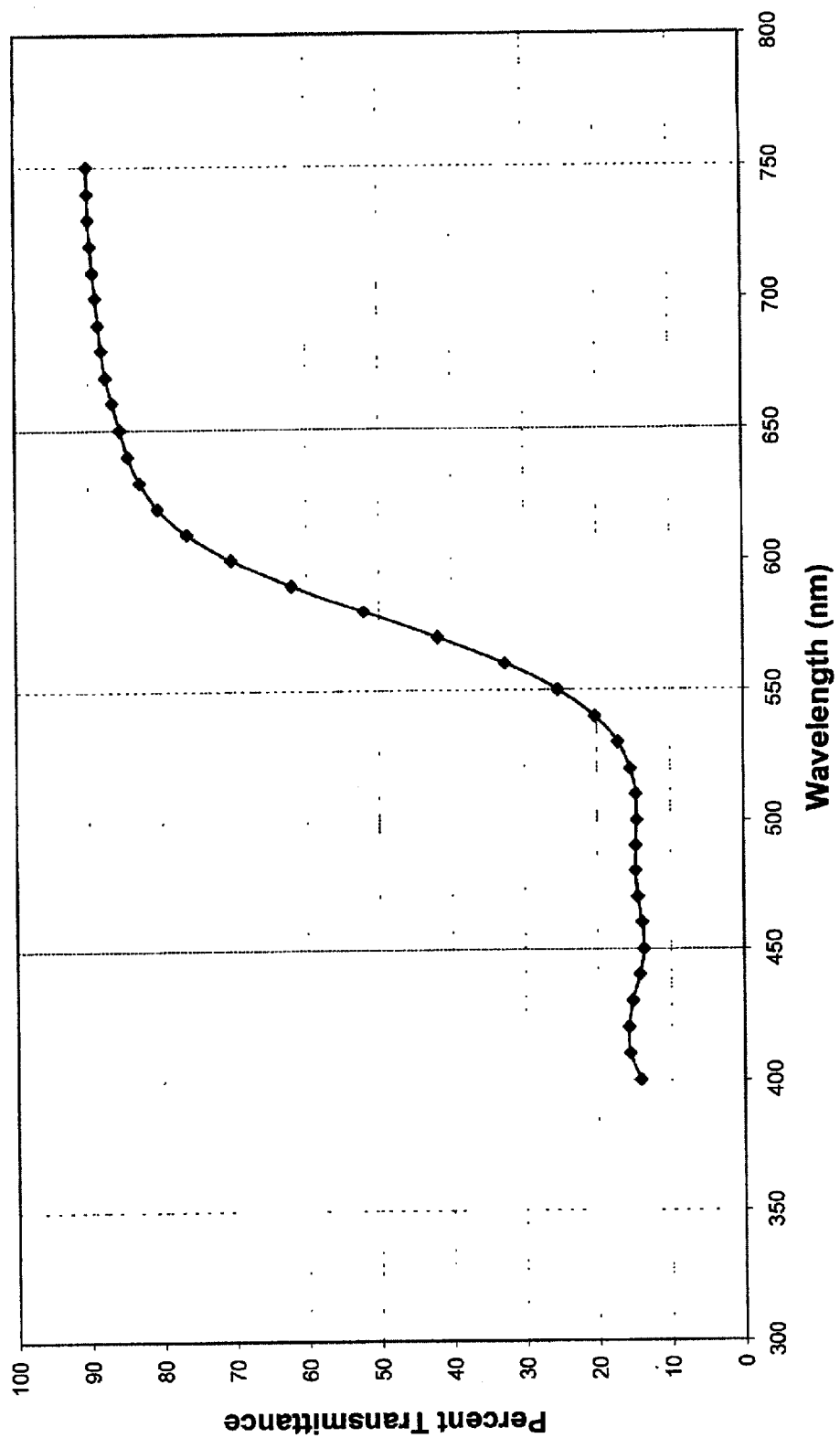

A SUNSENSOR® photochromic plastic lens was dipped into and tinted for 20 seconds in the red dye, followed by 10 seconds tinting in the yellow dye and subsequent brief dips in yellow or red dyes as needed. Spectral transmittance values and curve for the resulted lens were provided in FIG. 4.

Example 4

Figure 5:
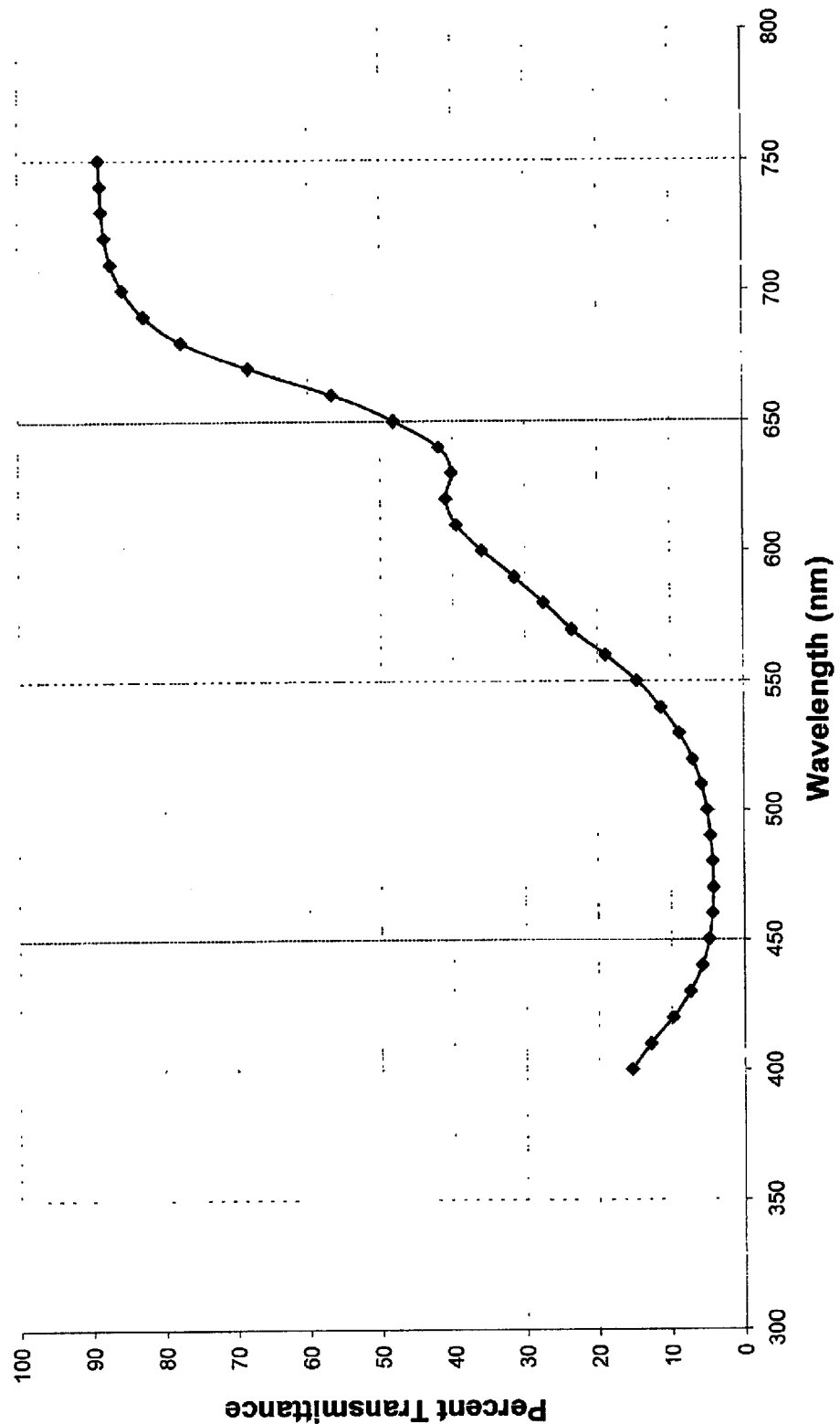

A SUNSENSOR® photochromic plastic lens was dipped into and tinted for 11 seconds in the brown dye, followed by 8 seconds tinting in the red dye and 6 seconds in the yellow dye and subsequent additional brief dips in each dye to achieve the desired filter lens. Spectral transmittance values and curve for the resulted lens were provided in FIG. 5.

Example 5

Figure 6:
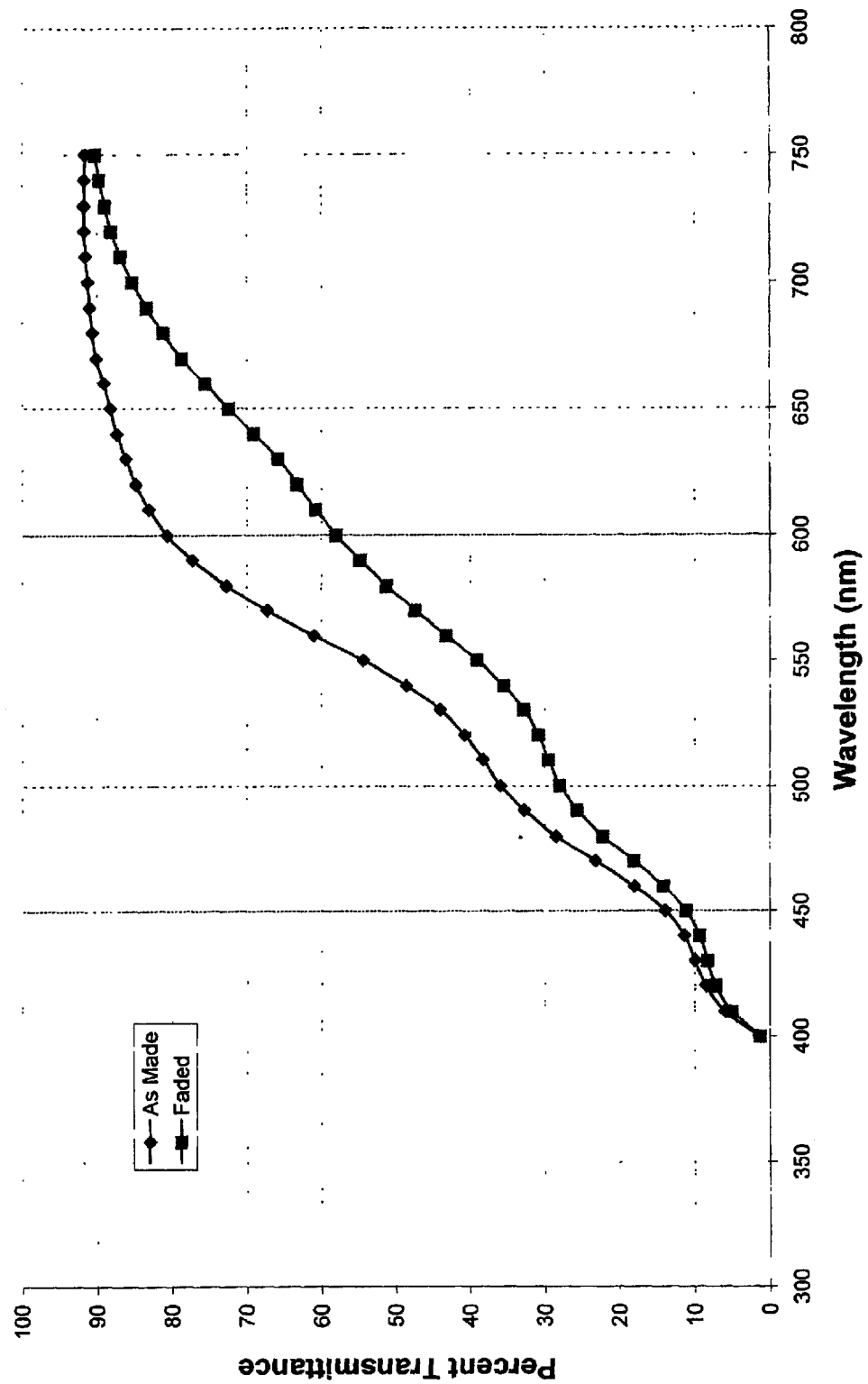

A TRANSITION® 3 plastic photochromic lens was tinted using similar method. Spectral transmittance values and curve for the resulted lens were provided in FIG. 6. As can be seen, FIG. 6 curve is similar to FIG. 3 curves, and its wavelength filtering properties fall inside the color box ABCDA of the color mixture diagram of FIG. 1. Therefore, the filter lens of this example is similar to that of example 2. However, the data of luminous transmittance in TABLE 3 show an important difference:

TABLE 3

Luminous Transmittance of Example Lenses

| Lens of Example | As-Made | Faded |
|---|---|---|
| 2 | 59.4 | 53.3 |
| 5 | 59.1 | 43.2 |

As can be seen from TABLE 3, the tinted TRANSITION 3 lens is 10 points darker than the tinted SUNSENSOR® lens in the overnight faded state. Since low-vision patients frequently use their spectacles both indoors and outdoors, this significant loss of transmittance for TRANSITION 3 is a disadvantage. For this reason, the SUNSENSOR® version is preferred.

Example 6

Figure 7:
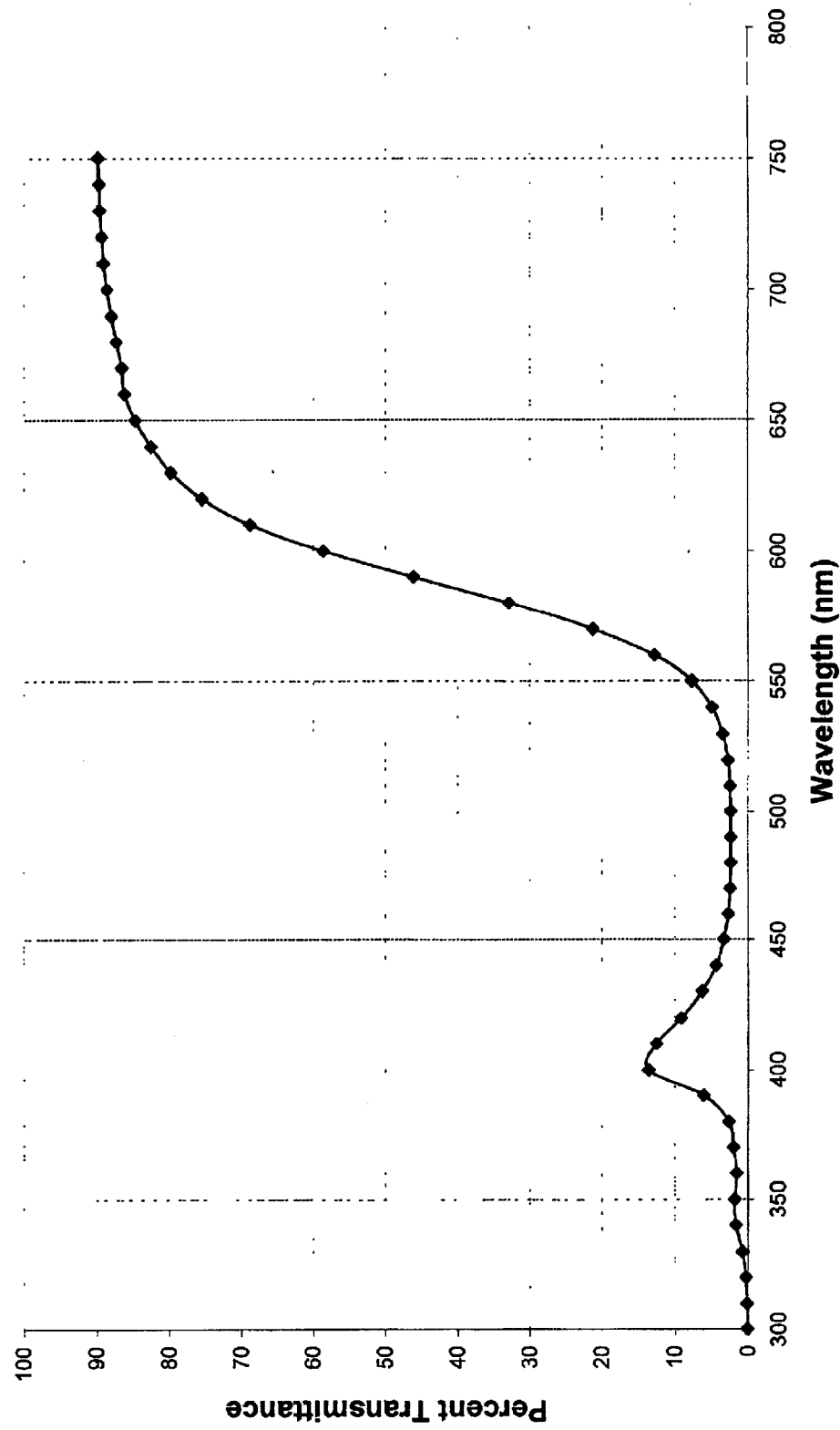

A SUNSENSOR® photochromic plastic lens was dipped into and tinted for 30 seconds in the red dye, followed by 5 seconds tinting in the yellow dye, 5 seconds in the red dye and 3 seconds in the yellow dye and subsequent additional brief dips in each dye to achieve the desired filter lens. Spectral transmittance values and curve for the resulted lens were provided in FIG. 7.

The wavelength filtering property of the product of this example falls outside of the color mixture diagram ABCDA of FIG. 1. Its wavelength filtration property is particularly suitable for patients suffering from retinitis pigmentosa.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A photochromic plastic ophthalmic filter lens having a polymer matrix with an effective amount of at least one photochromic agent distributed therein, applied thereto or associated therewith and at least one ophthalmic filtering dye applied thereto, associated therewith or distributed therein, said filter lens having a dominant wavelength between 570 and 605 nm and a color purity between 50% and 75%.

2. An ophthalmic plastic filter lens in accordance with claim 1, which exhibits strongly reduced transmittance of radiations having a wavelength shorter than about 440 nm.

3. An ophthalmic filter lens in accordance with claim 1 wherein the ophthalmic filtering dye is applied to at least one surface of the polymer matrix and thereby forms a filtering dye layer.

4. An ophthalmic filter lens in accordance with claim 1 wherein the ophthalmic filtering dye is distributed throughout the polymer matrix.

5. An ophthalmic filter lens in accordance with claim 1 wherein the ophthalmic filtering dye forms a filtering layer sandwiched between more than one polymer matrices, among which at least one is photochromic.

6. A photochromic plastic ophthalmic filter lens having a polymer matrix with an effective amount of at least one photochromic agent distributed therein, applied thereto or associated therewith and at least one ophthalmic filtering dye applied thereto, associated therewith or distributed therein, said filter lens exhibiting substantially reduced transmittance of radiations having a wavelength shorter than about 550 nm, a photopic transmittance no greater than about 25% in the faded state and no greater than about 10% in the darkened state, and a scotopic transmittance no greater than about 3% in the faded state and no greater than 1% in the darkened state at a wavelength between about 450–550 nm.

7. An ophthalmic filter lens in accordance with any one of claims 1 to 6, wherein the polymer matrix is made of organic polymers selected from the group consisting of poly($C_1$–$C_{12}$ alkyl methacrylates), poly(oxyalkylene dimethacrylates), poly(alkoxylated phenol methacrylates), cellulose acetate, cellulose triacetate, cellulose acetate propionate, cellulose acetate butyrate, poly(vinyl acetate), poly(vinyl alcohol), poly(vinyl chloride), poly(vinylidene chloride), thermoplastic polycarbonates, polyesters, polyurethanes, poly(ethylene terephthalate), polystyrene, poly($\alpha$-methylstyrene), poly(styrene-co-methyl methacrylate), poly(styrene-co-acrylonitrile), polyvinylbutyral and polymers and copolymers of monomers selected from the group consisting of polyol (allyl carbonate) monomers, polyfunctional acrylate monomers, polyfunctional methacrylate monomers, diethylene glycol dimethacrylate monomers, diisopropenyl benzene monomers, ethoxylated bisphenol A dimethacrylate monomers, ethylene glycol bismethacrylate monomers, poly(ethylene glycol) bismethacrylate monomers, ethoxylated phenol methacrylate monomers, alkoxylated polyhydric alcohol acrylated monomers and diallylidene pentaerythritol monomers.

8. An ophthalmic filter lens in accordance with claim 7, wherein the at least one photochromic agent is selected from the group consisting of spiroxazines, spiropyrans and chromenes.

9. An ophthalmic filter lens in accordance with claim 8, wherein the at least one photochromic agent is selected from the group consisting of naphthopyrans, benzopyrans, phenanthropyrans, spiro(benzindoline)naphthopyrans, spiro(indoline)benzopyrans, spiro(indoline)naphthopyrans, spiro(indoline)quinopyrans, spiro(indoline)pyrans, spiro(indoline)naphthoxazines, spiro(indoline)pyridobenzoxazines, spiro(benzindoline)pyridobenzoxazines, spiro(benzindoline)naphthoxazines, spiro(indoline)benzoxazines and any mixture or combination thereof.

10. An ophthalmic filter lens in accordance with claim 8, wherein the photochromic agent is distributed throughout the polymer matrix.

11. An ophthalmic filter lens in accordance with any one of claims 1 to 6, wherein the plastic matrix is made of at least one polymer selected from the group consisting of homopolymers, copolymers and combination of polymers of at least one monomer having the following formula (I):

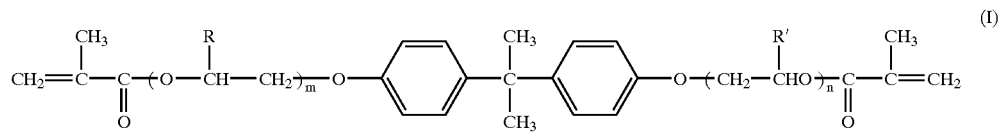
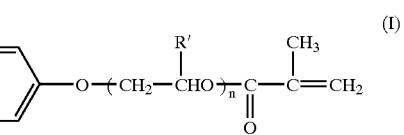

(I)

wherein,

R and R', identical or different, independently are $CH_3$ or H;

m and n, identical or different, independently are integers between 0 and 4 inclusive; and copolymers of at least one monomer having formula (I) and an aromatic monomer bearing vinyl, acrylic, or methacrylic functionality.

12. An ophthalmic filter lens in accordance with claim 11, wherein the photochromic agent is distributed throughout the polymer matrix.

13. An ophthalmic filter lens in accordance with claim 11, wherein the plastic matrix is made of at least one polymer containing units from a monomer of formula (I) where R and R' are H, and m=n=1.

14. An ophthalmic filter lens in accordance with claim 13, wherein the photochromic agent is 1,3,3-trimethylspiro[2H-indole-2,3'-[3H]phenanthra(9, 10b)[1,4]oxazine].

15. A method of producing a photochromic plastic filter lens which comprises treating a photochromic plastic article in at least one solution of at least one filtering dye for a time sufficient to impart to the lens the filtering properties of (i) having a dominant wavelength between 570 and 605 nm and a color purity between 50% and 75%, or (ii) exhibiting substantially reduced transmittance of radiations having a wavelength shorter than about 550 nm, a photopic transmittance no greater than about 25% in the faded state and no greater than about 10% in the darkened state, and a scotopic transmittance no greater than about 3% in the faded state and no greater than 1% in the darkened state at a wavelength between about 450–550 nm.

16. A method of producing a photochromic plastic filter lens which comprises adding and dispersing an effective amount of at least one photochromic agent and an effective amount of at least one ophthalmic filtering dye to a monomer or a mixture of monomers, and thereafter polymerzing the resultant mixture into a photochromic filtering polymer to produce the lens having the following filtering properties: (i) having a dominant wavelength between 570 and 605 nm and a color purity between 50% and 75%. or (ii) exhibiting substantially reduced transmittance of radiations having a wavelength shorter than about 550 nm, a photopic transmittance no greater than about 25% in the faded state and no greater than about 10% in the darkened state, and a scotopic transmittance no greater than about 3% in the faded state and no greater than 1% in the darkened state at a wavelength between about 450–550 nm.

17. A method in accordance with claim 16, wherein the monomer is selected from the group consisting of monomers having the following formula (I):

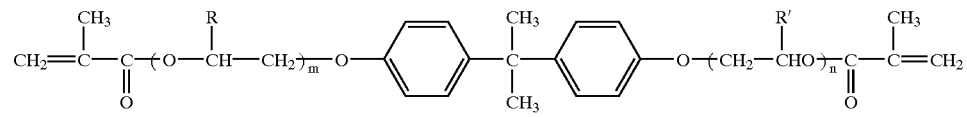
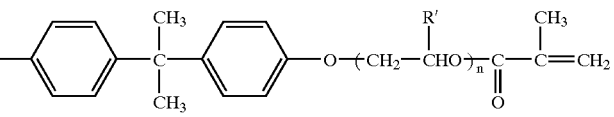

wherein,

R and R', identical or different, independently are $CH_3$ or H;

m and n, identical or different, independently are integers between 0 and 4 inclusive; and aromatic monomers bearing vinyl, acrylic, or methacrylic functionality.

18. A method in accordance with claim 17, wherein the at least one photochromic agent is selected from the group consisting of spiroxazines, spiropyrans and chromenes.

19. A method in accordance with claim 17, wherein the at least one photochromic agent is selected from the group consisting of naphthopyrans, benzopyrans, phenanthropyrans, spiro(benzindoline)naphthopyrans, spiro(indoline)benzopyrans, spiro(indoline)naphthopyrans, spiro(indoline)quinopyrans, spiro(indoline)pyrans, spiro(indoline)naphthoxazines, spiro(indoline)pyridobenzoxazines, spiro(benzindoline)pyridobenzoxazines, spiro(benzindoline)naphthoxazines, spiro(indoline)benzoxazines and any mixture or combination thereof.

20. A method in accordance with any one of claims 17 to 19, wherein the plastic matrix is made of at least one polymer containing units from a monomer of formula (I) where R and R' are H, and m=n=1.

21. The method of claim 20, wherein the photochromic agent is 1,3,3-trimethylspiro[2H-indole-2,3'-[3H]phenanthra(9, 10b)[1,4]oxazine].

* * * * *